(12) United States Patent
Moran et al.

(10) Patent No.: US 9,077,581 B2
(45) Date of Patent: Jul. 7, 2015

(54) DEVICE AND METHOD FOR MONITORING, RATING AND/OR TUNING TO AN AUDIO CONTENT CHANNEL

(75) Inventors: Dov Moran, Kfar Saba (IL); Itzhak Pomerantz, Kfar Saba (IL); Mordechai Teicher, Hod Hasharon (IL)

(73) Assignee: SANDISK IL LTD., Kfar Saba (IL)

(*) Notice: Subject to any disclaimer, the term of this patent is extended or adjusted under 35 U.S.C. 154(b) by 516 days.

(21) Appl. No.: 13/336,088

(22) Filed: Dec. 23, 2011

(65) Prior Publication Data

US 2012/0166631 A1 Jun. 28, 2012

Related U.S. Application Data

(62) Division of application No. 11/428,844, filed on Jun. 6, 2006, now Pat. No. 8,086,168.

(60) Provisional application No. 60/696,707, filed on Jul. 6, 2005.

(51) Int. Cl.
*H04B 1/16* (2006.01)
*H04L 29/06* (2006.01)
(Continued)

(52) U.S. Cl.
CPC .......... *H04L 29/06027* (2013.01); *H04H 20/82* (2013.01); *H04H 60/46* (2013.01);
(Continued)

(58) Field of Classification Search
CPC .................. H04L 12/40104; H04L 12/2602; H04L 43/00; H04B 17/0067; H04B 7/0671; H04B 7/0682; H04B 1/7075; H04W 28/22; H04W 52/267; H04W 52/42; H04W 72/1231; H04W 72/1278; H04W 8/18; H04H 60/46; H04H 60/65; H04H 20/82; H04H 60/372; H04H 60/47

USPC .............. 455/3.02–3.06, 186.1–188.1, 177.1; 709/224; 725/34, 41–43
See application file for complete search history.

(56) References Cited

U.S. PATENT DOCUMENTS 5,410,344 A 4/1995 Graves et al.
6,177,931 B1 1/2001 Alexander et al.
(Continued)

OTHER PUBLICATIONS

Notice of Allowance and Fee(s) Due for U.S. Appl. No. 11/428,844 (Aug. 18, 2011).
(Continued)

*Primary Examiner* — Lana N Le
(74) *Attorney, Agent, or Firm* — Jenkins, Wilson, Taylor & Hunt, P.A.

(57) ABSTRACT

Devices, methods and computer-readable code for simultaneously monitoring the content of at least two streaming audio content channels are disclosed. In some embodiments, the monitored content is analyzed, and one or more features of the monitored content channels are computed, including but not limited to music classification features, content genre features, and spoken content features. These computed features may be used, for example, to compute a rating or score for each monitored audio channel, for example, a rating computed relative to user listening preferences, expressed, for example, in preference rules. In some embodiments, the presently disclosed device includes a channel selector for automatically tuning, for example, to a channel assigned a higher rating at a given time. Alternatively or additionally, content rating scores may be displayed to a user who manually selects and tunes to an audio content channel.

10 Claims, 9 Drawing Sheets

(51) Int. Cl.

| | |
|---|---|
| *H04H 20/82* | (2008.01) |
| *H04H 60/46* | (2008.01) |
| *H04L 12/26* | (2006.01) |
| *H04H 60/65* | (2008.01) |
| *H04L 29/08* | (2006.01) |

(52) U.S. Cl.
CPC ........... *H04H 60/65* (2013.01); *H04L 12/2602* (2013.01); *H04L 43/00* (2013.01); *H04L 65/604* (2013.01); *H04L 67/02* (2013.01)

(56) References Cited

U.S. PATENT DOCUMENTS

| | | | |
|---|---|---|---|
| 6,378,035 | B1 | 4/2002 | Parry et al. |
| 6,711,379 | B1 | 3/2004 | Owa et al. |
| 6,756,997 | B1 | 6/2004 | Ward, III et al. |
| 6,944,430 | B2* | 9/2005 | Berstis ................. 455/186.1 |
| 6,993,290 | B1* | 1/2006 | Gebis et al. .............. 455/45 |
| 7,321,923 | B1* | 1/2008 | Rosenberg et al. ........... 709/217 |
| 7,328,450 | B2 | 2/2008 | Macrae et al. |
| 8,086,168 | B2 | 12/2011 | Moran et al. |
| 2002/0087987 | A1 | 7/2002 | Dudkiewicz et al. |
| 2002/0132616 | A1* | 9/2002 | Ross et al. ................. 455/419 |
| 2003/0101050 | A1 | 5/2003 | Khalil et al. |
| 2004/0042103 | A1 | 3/2004 | Mayer |
| 2004/0231498 | A1 | 11/2004 | Li et al. |
| 2005/0016360 | A1 | 1/2005 | Zhang |
| 2005/0234958 | A1* | 10/2005 | Sipusic et al. ............... 707/102 |
| 2006/0059504 | A1* | 3/2006 | Gomez et al. ............... 725/8 |
| 2006/0136211 | A1 | 6/2006 | Jiang et al. |
| 2006/0225088 | A1* | 10/2006 | Gutta ........................ 725/14 |
| 2007/0008956 | A1 | 1/2007 | Moran et al. |
| 2008/0077574 | A1* | 3/2008 | Gross ........................ 707/5 |
| 2008/0115167 | A1 | 5/2008 | Hermsmeyer et al. |
| 2008/0127265 | A1 | 5/2008 | Ward et al. |
| 2008/0182510 | A1 | 7/2008 | Khedouri et al. |
| 2009/0258595 | A1* | 10/2009 | Gielow et al. ................ 455/3.06 |
| 2011/0238754 | A1* | 9/2011 | Dasilva et al. ............... 709/204 |
| 2012/0054022 | A1* | 3/2012 | Kosashvili ................. 705/14.43 |

OTHER PUBLICATIONS

Final Official Action for U.S. Appl. No. 11/428,844 (Oct. 27, 2010).
"World-Wide Internet Radio FW-i1000," Datasheet, Philips, pp. 1-2 (Downloaded from the Internet on Sep. 1, 2010).
Official Action for U.S. Appl. No. 11/428,844 (Mar. 15, 2010).
Perrot et al., "Scanning the Dial: The Rapid Recognition of Music Genres," Journal of New Music Research, vol. 37, No. 2, pp. 93-100 (Jun. 2008).
Li et al., "Music Artist Style Identification by Semi-Supervised Learning From Both Lyrics and Content," Proceedings of the 12th Annual ACM International Conference on Multimedia (Oct. 10-16, 2004).
Li et al., "A Survey on Wavelet Applications in Data Mining," SIGKDD Explorations, vol. 2, Issue 4, pp. 49-68 (2003).
Hainsworth et al., "Onset Detection in Musical Audio Signals," Proceeding fo the International Computer Musical Conference (2003).
Tzanetakis et al., "Musical Genre Classification of Audio Signals," IEEE Transactions on Speech and Audio Processing, vol. 10, No. 5 (Jul. 2002).
Deshpande et al., "Classification of Music Signals in the Visual Domain," Proceedings of the COST G-6 Conference on Digital Audio Effects (DAFX-01), Limerick, Ireland (Dec. 6-8, 2001).
Foote et al., "The Beat Spectrum: A New Approach to Rhythm Analysis," IEEE International Conference (2001).
Goto, "An Audio-Based Real-Time Beat Tracking System for Music With or Without Drum-Sounds," Journal of New Music Research, vol. 30, No. 2, pp. 159-171 (2001).
Laroche, "Estimating Tempo, Swing and Best Locations in Audio Recordings," In Workshop on Applications of Signal Processing to Audio and Acoustics (2001).
Zhang et al., "Audio Content Analysis for Online Audiovisual Data Segmentation and Classification," IEEE Transactions on Speech and Audio Processing, vol. 9, No. 4 (May 2001).
Widmer, "The Musical Expression Project: A Challenge for Macine Learning and Knowledge Discovery," Proceeding fo the 12th European Conference on Machine Learning (ECML) (2001).
Li et al., "Content-Based Indexing and Retrieval of Audio Data Using Wavelets," IEEE International Conference on Multimedia and Expo (II), pp. 885-888 (2000).
Pye, "Content-Based Methods for the Management of Digital Music," Proceedings of the 2000 IEEE International Conference on Acoustic Speech and Signal Processing (2000).
Tzanetakis et al., "Marsyas: A Framework for Audio Analysis," Organized Sound, vol. 4, No. 3, pp. 169-175 (2000).
Lambrou et al., "Classification of Audio Signals Using Statistical Features on Time and Wavelet Transform Domains," ICASSP, vol. 6, pp. 3621-3624 (1998).
Scheirer, "Tempo and Beat Analysis of Acoustic Musical Signals," Journal of the Acoustical Society of America, vol. 103, No. 1, (1998).
Soltau et al., "Recognition of Music Types," Proceedings of the 1998 IEEE International Conference on Acousitics, Speech and Signal Processing (1998).
Foote, "Content-Based Retrieval of Musci and Audio," Multimedia Storage and Archiving Systems II, Proceedings of SPIE, pp. 138-147 (1997).
Scheirer et al., "Construction and Evaluation of a Robust Multifeature Speech/Music Discriminator," ICASSP'97, pp. 1331-1334 (1997).
Saunders, "Real-Time Discrimination of Broadcast Speech/Music," ICASSP'96, pp. 993-996 (1996).
Wold et al., "Content-Based Classification, Search and Retieval of Audio," IEEE Multimedia, vol. 3, No. 2, pp. 27-36 (1996).
Dietterich et al., "Solving Multiclass Learning Problems via Error-Correcting Output Codes," Journal of Artificial Intelligence Research, vol. 2, pp. 263-286 (1995).
Goto et al., "A Beat Tracking System for Acoustic Singals of Music," ACM Multimedia, pp. 365-372 (1994).
Flandrin, "Wavelet Analysis and Synthesis of Fractional Brownian Motion," IEEE Transactions on Information Theory, vol. 38, No. 2 (Mar. 1992).

* cited by examiner

| Station | Score | Genre | Song | Artist | Time into Song |
|---|---|---|---|---|---|
| KRTC | 42 | Sports | | | |
| KBYZ | 38 | Rock Music | Piano Man | Billy Joel | 3:42 |
| KZZR | 35 | Rock Music | Woodstock | CSN&Y | 2:01 |
| KBBR | 29 | Classical | Beethoven 9th | London Symphony | 0:52 |
| www.my cooljazz. com | 25 | Jazz | Georgia on My Mind | Ray Charles | 4:11 |

Display Area 50

User Controls for manual tuning 60

FIG.1

DEVICE AND METHOD FOR MONITORING, RATING AND/OR TUNING TO AN AUDIO CONTENT CHANNEL

CROSS-REFERENCE TO RELATED APPLICATIONS

This application is a divisional of U.S. patent application Ser. No. 11/428,844, filed Jun. 6, 2006 now U.S. Pat. No. 8,086,168, which claims the benefit of U.S. Provisional Patent Application Ser. No. 60/696,707, filed Jul. 6, 2005; the disclosures of which are incorporated herein by reference in their entireties.

FIELD OF THE INVENTION

The present invention relates to apparatus, methods, and computer-readable code for rating and/or tuning to audio content including but not limited to audio content streamed over the Internet.

BACKGROUND

Conventional radio receivers for receiving broadcast audio content have been known in the art, for approximately a century. In the last decade, with the advent of internet radio receivers (residing in an ordinary microcomputer, or in a "dedicated" internet radio device such as the Philips Internet Radio Mini Shelf Stereo-#FWI-1000) and satellite radio receivers, users have been given access to an enormous number of audio broadcast channels.

In all of the aforementioned devices, at any given time, the user can tune to a single station selected from a plurality of possible stations. The user needs to make a decision and perform a manual operation in order to switch between stations.

Many users of radio devices are known to engage in a behavior known as "channel surfing," where the user listens to each of a number of channels for a brief period of time, in order to determine what content is currently "being played" on each station, and to determine which audio streaming content station (for example, which conventional radio station, which satellite radio station, which internet radio station) is preferred at a given time.

Although a certain population of users actually enjoys the "channel surfing experience," many consider the need to channel surf an unnecessary burden. There is an ongoing need for devices, methods and computer-readable code which facilitate the process where users may access, with a minimum amount of hassle, a "preferred" audio broadcast channel selected from a plurality of candidate broadcast channels.

SUMMARY

Some or all of the aforementioned needs, and other needs, may be satisfied by several aspects of the present invention.

It is now disclosed for the first time apparatus for content tuning comprising: a) a multi-channel monitor (i.e. to receive streaming content and to store streaming content in volatile and/or non-volatile memory) operative to concurrently monitor a plurality of channels, each channel providing respective streaming content; b) a content analyzer (for example, a feature extractor and/or a content rater) operative to analyze streaming content of the monitored content channels; and c) a channel selector for tuning to one of: i) a channel selected from the plurality of channels in accordance with results of the analysis; and ii) pre-stored audio content (for example, pre-stored content provided by a user, for example, from an MP3 collection, for example, archived audio content recorded from a content channel at an earlier time, for example, minutes and/or hours ago).

Thus, some embodiments of the present invention obviate the need to channel surf by providing an "automatic" content selection mechanism. Some embodiments of the present invention, as will be explained be, reduce the need to channel surf by presenting and/or "pushing" information to the user to allow the user to select content without jumping to channels whose quality is unknown—this may be done, for example, by visually presenting "rating" information to the user. In some embodiments, the device limits an array of selectable channels such that fewer channels, i.e. the "best" channels, are "available" for a user to tune to than the total number of channels monitored.

In some embodiments, the channel selector is operative to switch from a presently-played station to a different station in accordance with results of the analysis (for example, in accordance with extracted features and/or content ratings).

In some embodiments, the multi-channel monitor is operative to monitor at least one streaming audio content channel selected from the group consisting of a conventional radio station, an internet radio station and a satellite radio station. The multi-channel monitor may monitor a plurality of internet radio channels.

In some embodiments, the channel selector is operative to select the selected content channel in accordance with a set (i.e. one or more) of pre-determined preference rules (for example, rules about what is allowed and not allowed, scoring rules, or any other rules).

In some embodiments, the channel selector is operative such that the pre-determined preference rules are applicable both to the content channel and to the pre-stored audio content. Thus in some embodiments, if only "low rated" audio content is available in the streaming audio channels, the device may provide pre-stored content instead.

In some embodiments, the presently disclosed device further comprises a rule input interface for receiving rule specification data specifying at least in part at least one the pre-determined preference rule. The "rules" may be, in some embodiments, "yes/no" rule (for example, "ban this" rules, or "must play" rules). Alternatively or additionally, the rules may relate to scoring and/or rating audio content.

In some embodiments, at least one rule relates to a history of tuned content. Thus, in one example, if a preferred band was played recently, the content station playing the preferred band would gain fewer point (or even lose points) than a preferred band that has not been played in a longer time.

In some embodiments, the content analyzer is operative to compute respective sets (i.e. one or more) of audio content features of the respective streaming content of each channel, and to assign a respective rating or score to each monitored channel in accordance with the pre-determined preference rules and in accordance with the computed respective set of audio content features, and wherein the channel selector is operative to effect the selection (i.e. selection of the channel to which to tune) in accordance with the respective ratings or score.

In some embodiments, the score is periodically updated (for example, a later part of a song may have a higher score than the beginning of the song, and thus, for each concurrently monitored station, the rating and/or score may be calculated periodically, for example, every 2 seconds, or every 2 minutes, where there may be a tradeoff between "accuracy" and computational resources). Thus, in some embodiments, the content analyzer is operative to periodically update one or more computed ratings or score.

In some embodiments, the channel selector is operative to switch from a presently-played station to a different station if a current rating or score (for example, indicative of a rating and/or match between computed features of audio content and pre-determined preferences and/or rules) of the different station exceeds a rating or score of the presently played station.

In some embodiments, the content analyzer is operative to extract at least one feature of the streaming content selected from the group consisting of a music feature and a speech feature.

In some embodiments, the content analyzer is operative to extract at least one feature of streaming content selected from the group consisting of an artist identity, a musical instrument type feature, a text content feature, a tempo feature, a content genre feature, a music genre feature, a live audience feature, a vinyl record feature, and the presence or absence of a specific audio clip.

In some embodiments, the presently disclosed device further includes d) an archive engine for archiving audio content of a monitored channel to generate archived content, and wherein the pre-stored audio content includes the archived content.

It is now disclosed for the first time a method for content tuning comprising: a) concurrently monitoring a plurality of channels, the channel providing respective streaming content; b) computing respective feature sets (i.e. a feature set includes one or more features) of the respective streaming content of the monitored content channels; and c) tuning to one of: i) a channel selected from the plurality of channels in accordance with results of the analysis; and ii) pre-stored audio content.

It is now disclosed for the first time an audio content processing device that is operative to: a) monitor the content of at least two streaming audio content channels simultaneously; and b) compute respective ratings for each the monitored content channel.

In some embodiments, the device is further operative to c) display to a user data indicative of computed ratings.

It is now disclosed for the first time a method for rating audio content comprising: a) concurrently monitoring a plurality of channels, each channel providing respective streaming content; b) computing respective ratings of the respective streaming content of the monitored content channels.

It is now disclosed for the first time an audio content feature extraction device that is operative to: a) monitor the content of at least two streaming audio content channels simultaneously; and b) compute, for each monitored content channels, a respective set of audio content features, wherein each respective set of audio content features includes at least one of a music feature, and a speech feature.

According to some embodiments, the speech feature is selected from the group consisting of a spoken text feature (implemented, for example, voice to text), a sung text feature (implemented, for example, voice to text), a foreign language feature (i.e. an identity of a language, for example, French, Spanish, English or Chinese), an accent feature (for example, identifying Southern or British accents), an identity of a speaker (for example, a known DJ, or talk show host, or politician, or news figure), an identity of a singer, and a text-content feature.

Exemplary music features include but are not limited to music metric feature (for example, tempo) and a music classification feature (for example, an artist identity, or composer identity, band identity, music genre).

It is now disclosed for the first time a method for deriving audio content features comprising: a) concurrently monitoring a plurality of channels, each channel providing respective streaming content; and b) computing respective feature sets of the respective streaming content of the monitored content channels, wherein each respective feature set includes at least one of a music feature (for example, a music metric feature, or a music classification feature) and a speech feature (for example, an identity or accent or language used by a speaker, for example, a feature of the actual text spoken by the speaker for example, implemented using voice-to-text).

BRIEF DESCRIPTION OF THE DRAWINGS

FIG. 1 provides an illustration of an exemplary device interface for displaying ratings of audio content in accordance with exemplary embodiments of the present invention.

Figure 2:
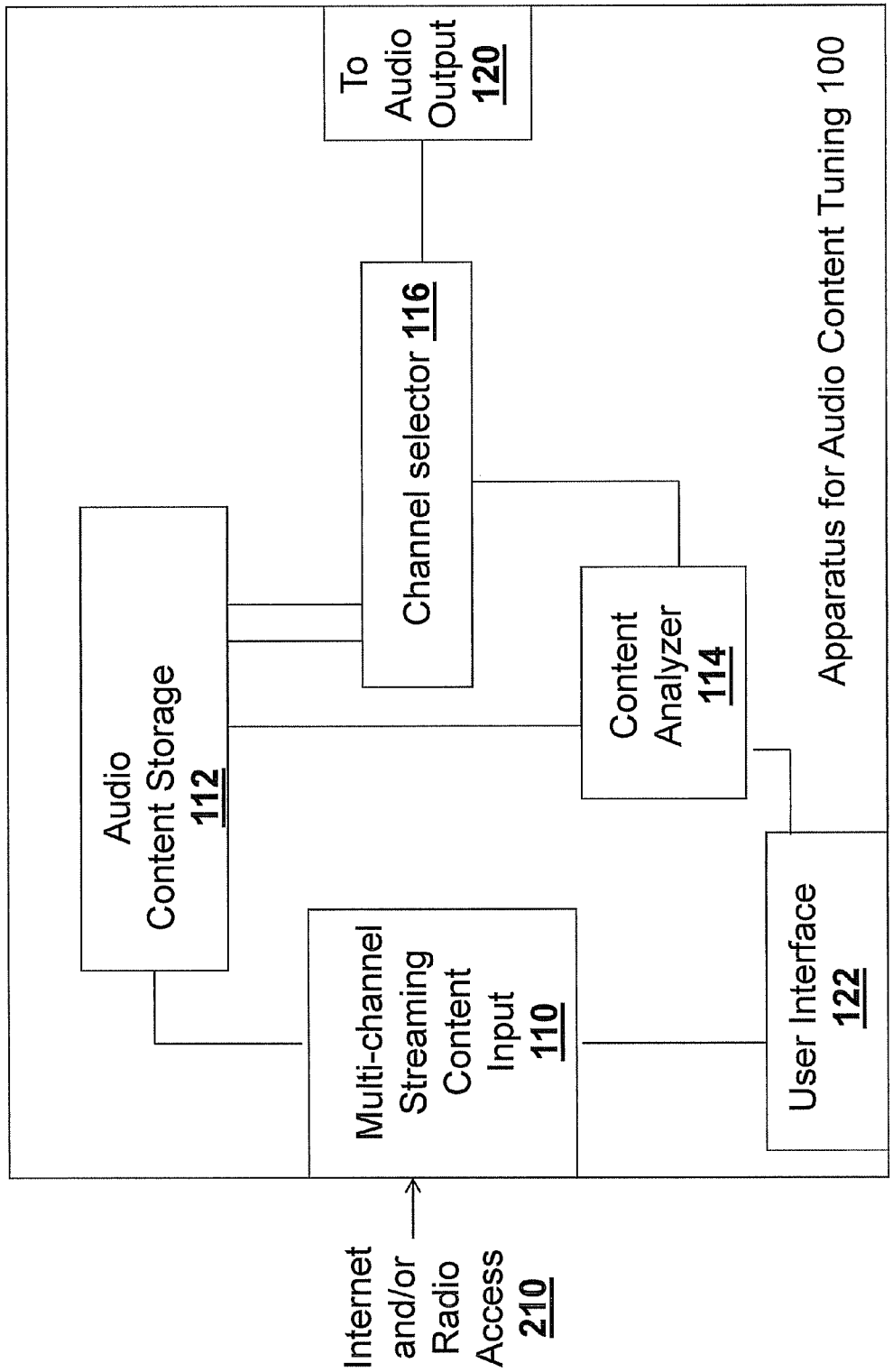
FIG. 2 provides a block diagram of an exemplary device for audio content tuning.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word "may" is used in a permissive sense (i.e., meaning "having the potential to"), rather than the mandatory sense (i.e. meaning "must").

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed apparatus, device and computer-readable code for rating incoming content of streaming audio channels and/or tuning to a streaming audio channel is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

Audio Tuning Device

The present inventors are disclosing for the first time a device which is operative to (a) concurrently monitor a plurality of audio content streams (i.e. concurrently receive the streaming content and to record at least some received content to a memory, for example, a buffer), (b) to analyze the monitored streaming content (i.e. to compute various features, and to prefer some features over others), and (c) to tune to an audio channel automatically selected from a plurality of audio channels in accordance with results of the aforementioned analysis. In exemplary embodiments, the device is operative to effect the aforementioned selection in accordance with (sometimes competing) user preferences and/or rules.

A number of non-limiting use scenarios where this may be useful are now disclosed. According to a first example, the presently disclosed device handles a first user preference to play music by a certain composer, whose music is not played often on the radio. According to this example, when one of the composer's works is played on the radio, the device may either: (A) 'turn on' (i.e. if the device is turned "off" and not playing any channels at the time) and automatically tune to the station playing this composer's work and/or (B) automatically switch from a currently played station (or a currently played 'static' archived audio content) to the now preferred station that is playing the composer's work. Thus, thanks to the presently disclosed device, the user will not "miss" the opportunity to hear the particular song when it is played, and the need to manually monitor (i.e. "channel surf") different stations in order to "find" desired audio content streamed from a given station may be reduced.

According to a second example, the presently disclosed device handles a user preference for music with trombone solos.

It is appreciated that there may be certain scenarios where conflicts arise in user music preferences. According to one use scenario, the device is configured to handle both the aforementioned composer preference and instrument preference (i.e. the "trombone"). According to this user scenario, at a given time, a first station is streaming a piece by the preferred composer, while a second station is streaming a trombone solo. Thus, the device may be configured to "choose" between these two stations. A number of techniques for handling such conflicts are disclosed herein.

Audio Content Rating Device

The previous section disclosed, for the first time, a device operative to concurrently analyze content of a plurality of audio content channels, and to tune to a selected audio content channel in accordance with the results of the analysis.

In some embodiments, for each channel, a "rating" indicative of how closely currently played content of the audio channel matches user preferences is computed. Thus, if a user has indicated a preference for fast tempoed music, this could lead to a high rating for an audio content channel playing a song that has a faster tempo.

Although the simultaneously monitoring and rating of audio content streamed by a plurality of audio content channels may be useful for selecting a given audio content channel for automating tuning, this is not a limitation of the present invention. In some embodiments, the user may want an option to manually tune to an audio content channel, but, nevertheless, to receive "guidance" from ratings or scores of various audio channels that are computed in accordance with user preferences. In some embodiments, various music and/or speech features of simultaneously monitored audio channels may be determined without computing a rating, and/or without automatic tuning.

FIG. 1 illustrates various exemplary features of embodiments where content from different audio channels rated and the ratings are visually displayed to a user. The device of FIG. 1 provides a display area 50 for visually displaying ratings of different content channels. As explained below, these rating may be computed, for example, in accordance with derived features of the audio content and/or pre-determined rules, for example, rules explicitly input by the user and/or implicit rules.

Thus, referring to FIG. 1, various content channels (for example, radio stations) are listed in the display area 50. In the example of FIG. 1, a rating or score (for example, displayed as a number, displayed graphically, or in any other manner) is displayed for each station, as well as other optional data providing, to the user, an indication of the content being played on each station, without a need to "channel" surf to the particular station.

In the example of FIG. 1, the stations are sorted, with the highest rated station displayed first. In some embodiments, a plurality of stations are simultaneously monitored and rated, and the rating for only a sub-plurality of the plurality (for example, the highest rated at the given time) are displayed. Thus, although the particular example of FIG. 1 shows ratings and other data for five stations, it is possible that even more stations are monitored and rated (for example, hundreds of stations). Thus, it is assumed, in the example of FIG. 1, that the user is less interested in viewing data about lower-rated stations.

Another salient feature of the non-limiting example of FIG. 1 is that the stations are sorted in descending order, with the highest-rated station displayed first. In some embodiments, the device includes user controls 60 for manually tuning to a station selected from the plurality.

In some embodiments of the present invention, a time elapsed since a song has begun may be computed (for example, as disclosed in US 2004/0042103), and this number may be displayed to the user in display area 50. This may be useful, for example, to advice a user that even though a given station plays highly rated content, the song has begun a certain time ago, and it may not be worth it to tune to the particular station.

Audio Feature Extraction Device

Figure 6:
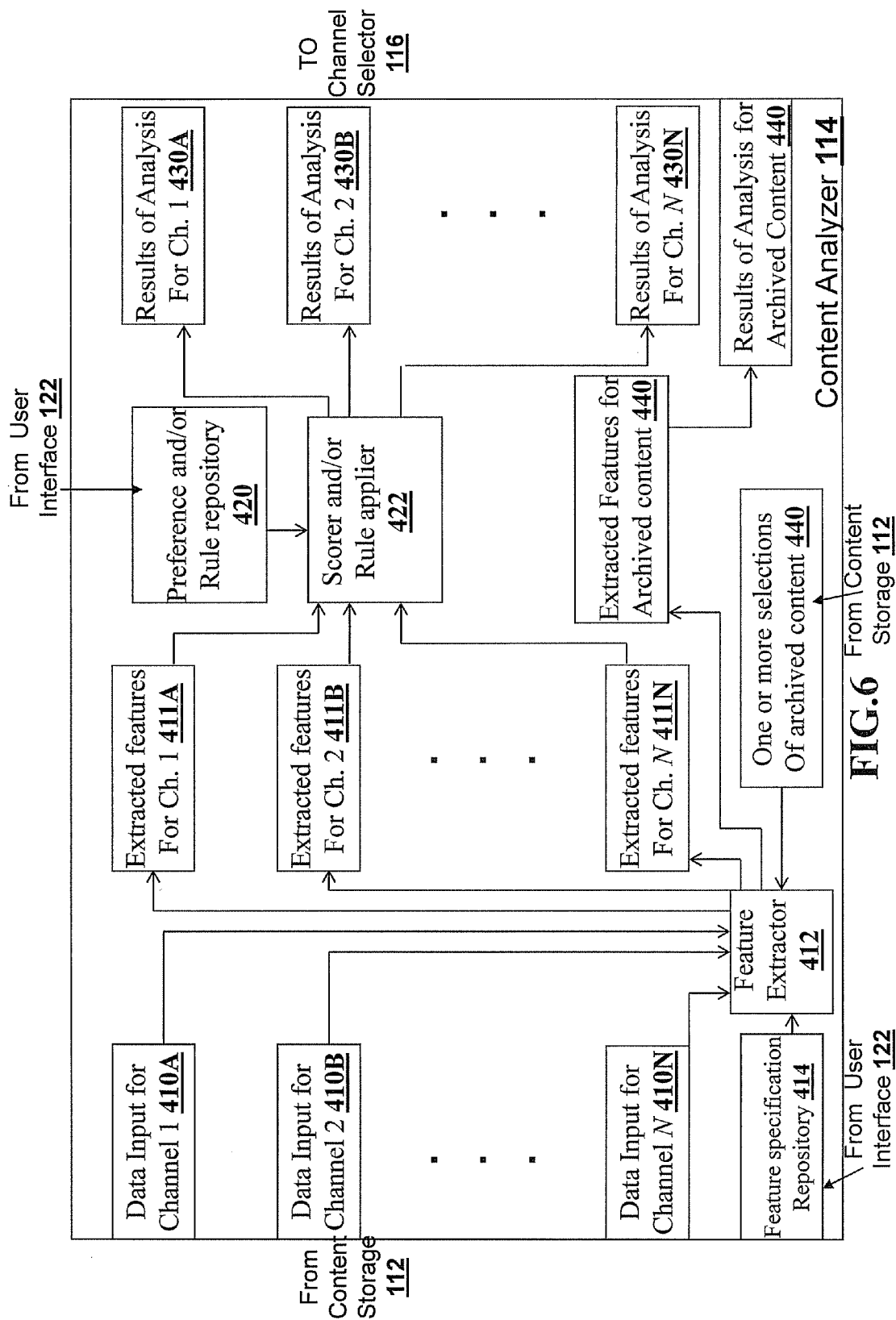
FIG. 6 provides a block diagram of an exemplary audio content analyzer.

Although FIG. 1 describes a specific system provided by some embodiments of the present invention, it is appreciated that not every component is required by every embodiment. For example, the audio content rating device, operative to provide ratings for a plurality of simultaneously monitored and/or received audio channels, may include or lack channel selector 116. In another example, an audio feature determining device, operative to compute features for a plurality of simultaneously monitored and/or received audio channels (for any purpose, for example, to computer compute ratings, or to compute aggregate parameters of different stations, or any other purpose) may include or lack channel selector 116 and may include or lack scorer 422 disclosed in FIG. 6 for rating and/or scoring audio content, for example, in accordance with different rules. Thus, the specific implementations described in the figures and accompanying text are to be construed as describing various embodiments, and not as limiting of the invention as a whole.

Overview of an Exemplary Audio Tuning Device 100

FIG. 2 provides a block diagram of apparatus 100 for audio content tuning in accordance with non-limiting exemplary embodiments of the present invention. The apparatus 100 (implemented as one or more devices) includes a multi-channel streaming content input 110 for receiving a plurality of streams of content 210 broadcast using one or more electronic content delivery means (for example, broadcast via the Internet, broadcast via a satellite broadcast network, and/or broadcast via "conventional" means—i.e. AM, FM, or any other bandwidth). The received content is stored in a content storage 112, which may include one or more data buffers, and may optionally provide additional features, including but not limited to features disclosed in the presently-described embodiments. A content analyzer 114 is operative to concurrently analyze one or more features of the audio content received form the plurality of audio content channels. In accordance with the results of the analysis, the channel selector 116 selects an audio channel (i.e. one of the streamed channels, or optionally archived audio content) to be forwarded to an audio output device 120.

Although not a limitation of the present invention, the content analyzer 114 may be configurable in accordance with user preferences received through a user interface 112. Exemplary user preferences include but are not limited to feature definitions (i.e. which features should be detected by the content analyzer 114—for example, a song tempo, a music genre, the presence or absence of a live audience, the presence or absence of a specific audio clip, an identity of a singer), rule preferences (for example, a rule to prefer fast tempoed music, a rule to prefer a song or content that has not been played in a longer time), and rule combining preferences (for example directive for how to weigh certain rules).

Exemplary embodiments of each of the aforementioned components are now described. Each component disclosed herein (i.e. both for the tuning device as well as the rating device that may or may provide a channel selector 116) may be implemented in any combination of hardware, software and firmware. It is noted that the teachings of the present invention are applicable to devices (or pluralities of cooperating devices) with any form factor, including but not limited to "ordinary" micro-computes configured with computer-readable code and "dedicated" radio devices (including but not limited to car radios, portable radio devices, and fixed devices).

Exemplary Multi-Channel Streaming Content Input 110

Figure 3:
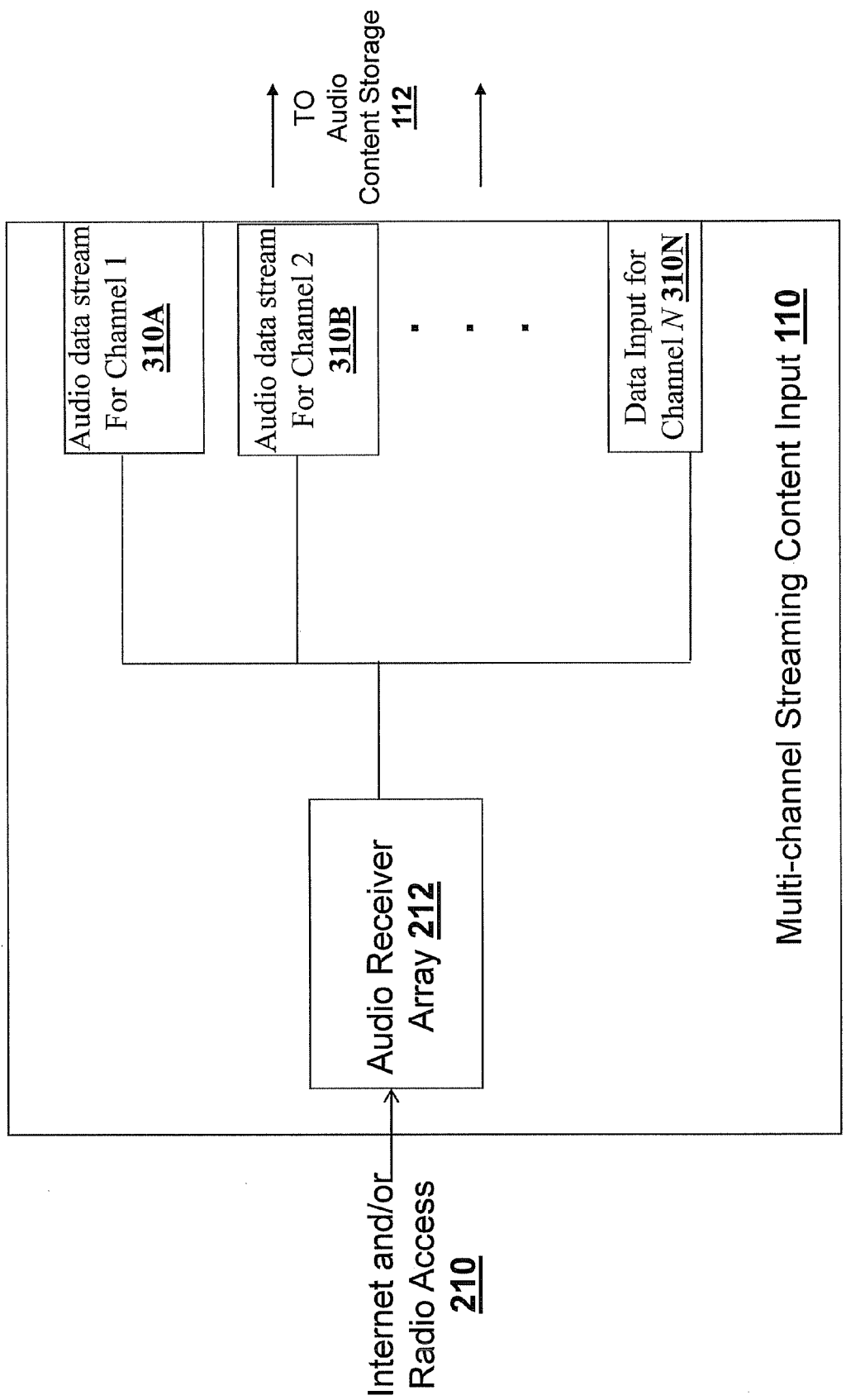
FIG. 3 provides a block diagram of an exemplary streaming content input.

FIG. 3 provides a block diagram of an exemplary multi-channel streaming content input 110 in accordance with exemplary embodiments. An audio receiver array 212 includes one or more types of audio receivers for receiving one or more types of audio stations (including but not limited to interne stations, "conventional" AM and/or FM radio stations, satellite radio stations). A plurality of data streams 310 are output by the audio receiver 212, where each data stream provides content from a respective audio channel.

There are a number of ways for configuring the multi-channel streaming content input 110. In some embodiments, a user interface 122 operative for receiving user configuration preferences for which stations (for example, a list of stations or data describing a "type" of station—for example, in a geographic location, a content genre, etc) to "listen to" or "monitor" is provided. This user interface 122 may have any form factor—for example, the user interface 122 may include a keyboard and/or a mouse or any other user input device, and that user interface 122 may include software and/or hardware components for displaying feedback to a user on a display screen.

Alternatively or additionally, the multi-channel streaming content input 110 may include one or more software and/or components for automatically determining which stations to receive content from—for example, in accordance with historical preferences, in accordance with availability, in accordance with descriptions of content stations (for example, automatically downloaded from the Internet), or in accordance with any other considerations. Thus, it is appreciated that any combination of manual and automatic configuring of the Exemplary Multi-Channel Streaming Content Input 110 is within the scope of the present invention.

Figure 4A:
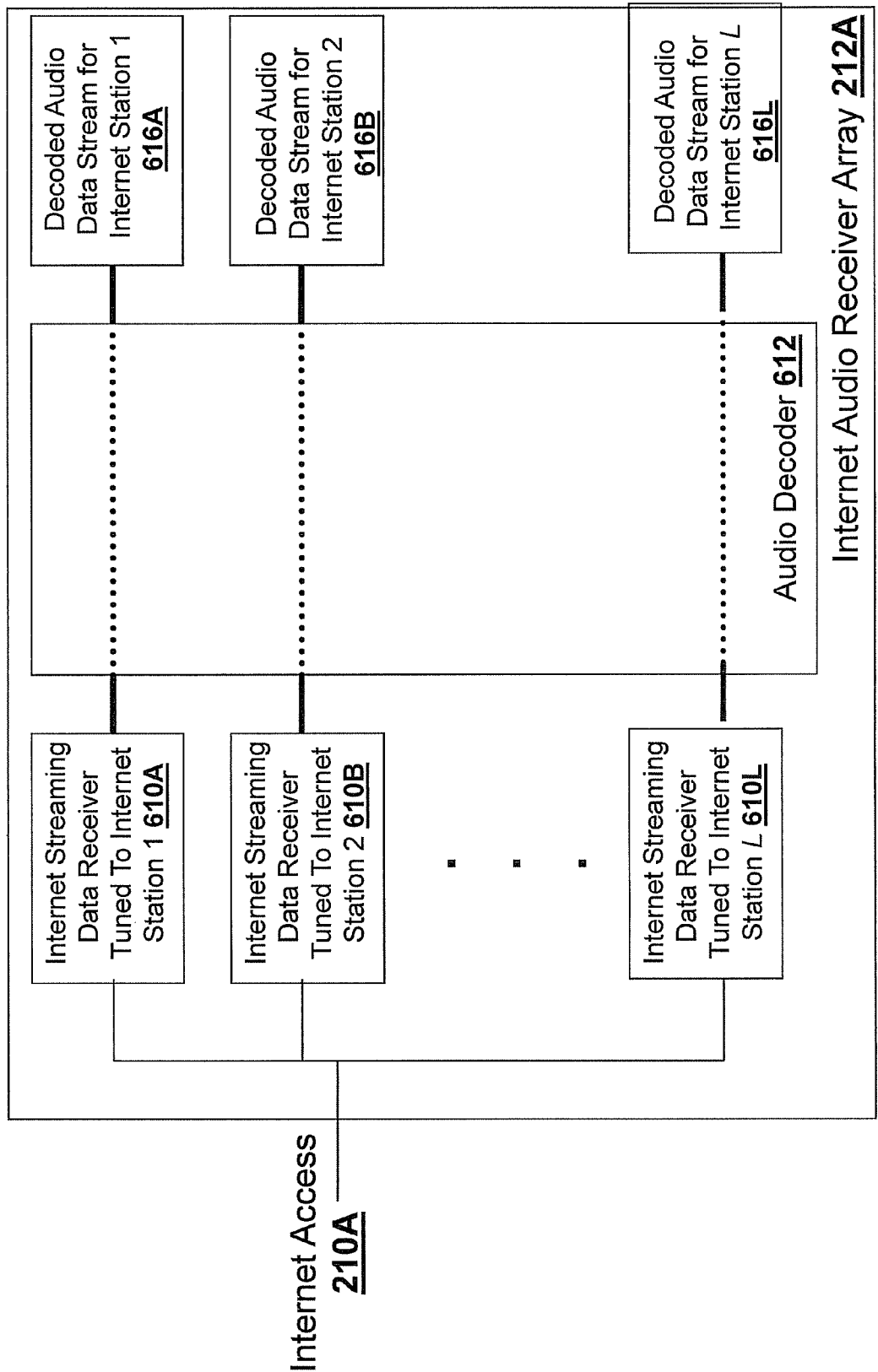
FIGS. 4A-4B provide a block diagram of exemplary audio receiving arrays.
Figure 4B:
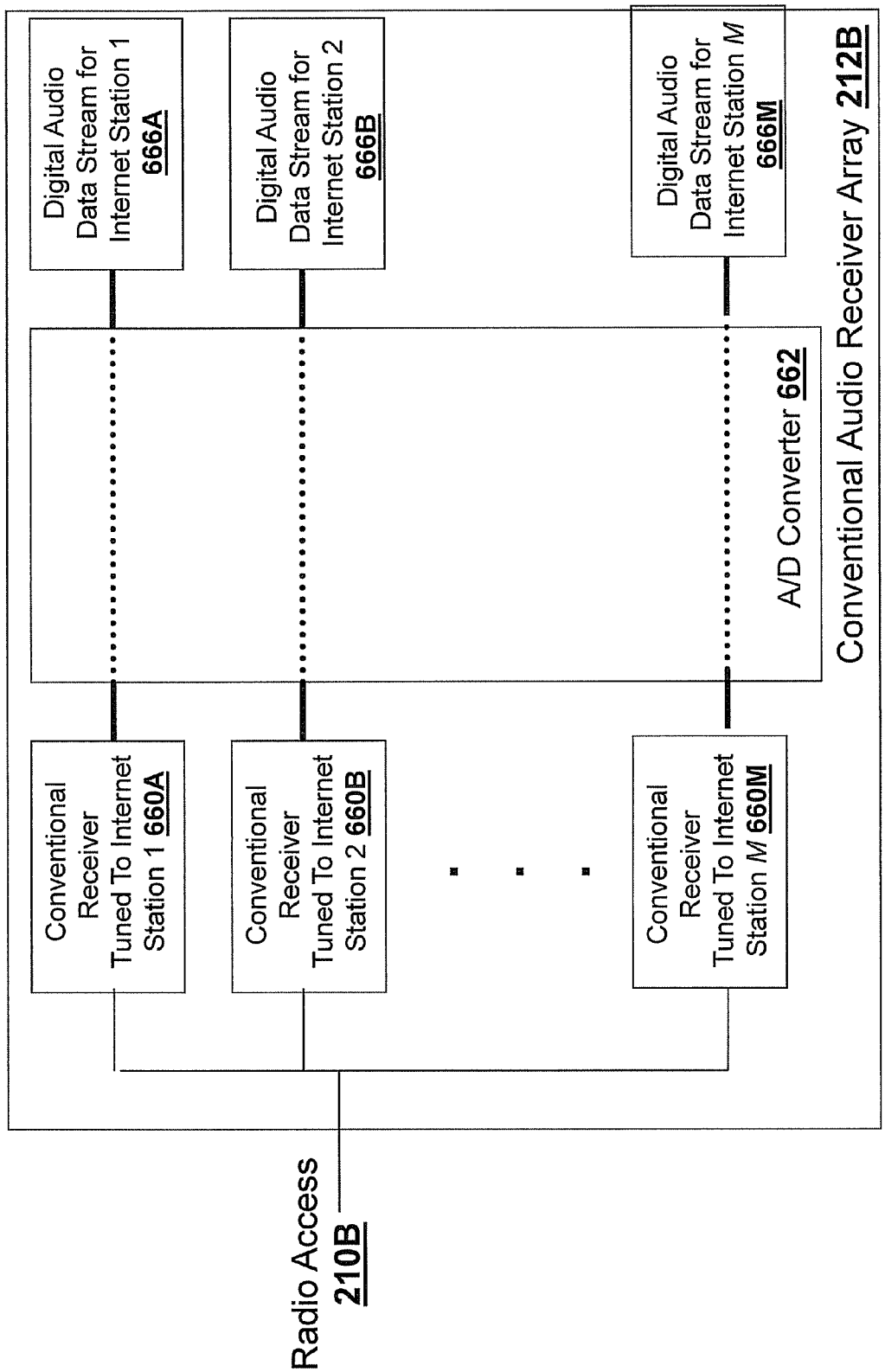

FIGS. 4A and 4B provide block diagrams of exemplary internet audio receiver array 212 in accordance with exemplary embodiments of the present invention. It is appreciated that a single device may provide more than one time of audio receiver—i.e. may implement both the receiver array 212 of FIG. 4A as well as the receiver array 212 of FIG. 4B.

Referring to FIG. 4A, a plurality of internet data streams 610 (representing streaming audio) are received and decoded with one or more audio decoders 612, which outputs decoded data streams 616, each decoded data stream associated with a respective station. In the non-limiting example of FIG. 4A, L internet radio stations are handled.

Referring to FIG. 4B, a plurality of "conventional" radio stations are received through a conventional receiver array 660 that simultaneously tunes to M radio stations. An audio to digital converter 662 converts the received signal, to outputs a digital audio data stream 664 for each respective data stream.

It is appreciated that internet audio receivers others than those described in FIGS. 3A-3B are within the scope of the present invention, for example, satellite receivers for receiving a plurality of satellite radio stations.

Audio Content Storage 112

In some embodiments, the audio content storage 112 includes one or more data buffers for storing captured audio data or a derivative thereof. In the exemplary embodiment described in the figures, a total of N channels are stored in the audio content storage 112.

For example, US 2004/0042103, which relates to different subject matter (i.e. retroactive recording) discloses a device having a plurality of circular buffers. The skilled artisan is also directed to as disclosed in U.S. Pat. No. 6,378,035. The present inventor is now disclosing that a ringed buffer storage 314 (used in some but not all embodiments) may be useful for reducing or eliminating any annoying delay of synchronization encountered when switching between station. This may facilitate smooth switching between stations.

It is noted that the audio content storage 112 may include volatile memory (for example, RAM) and/or non-volatile memory (for example, flash memory and/or magnetic media). Furthermore, in some embodiments, the aforementioned memory may be provided as the memory of a microcomputer in which any part of the audio content storage 112 resides.

Figure 5:
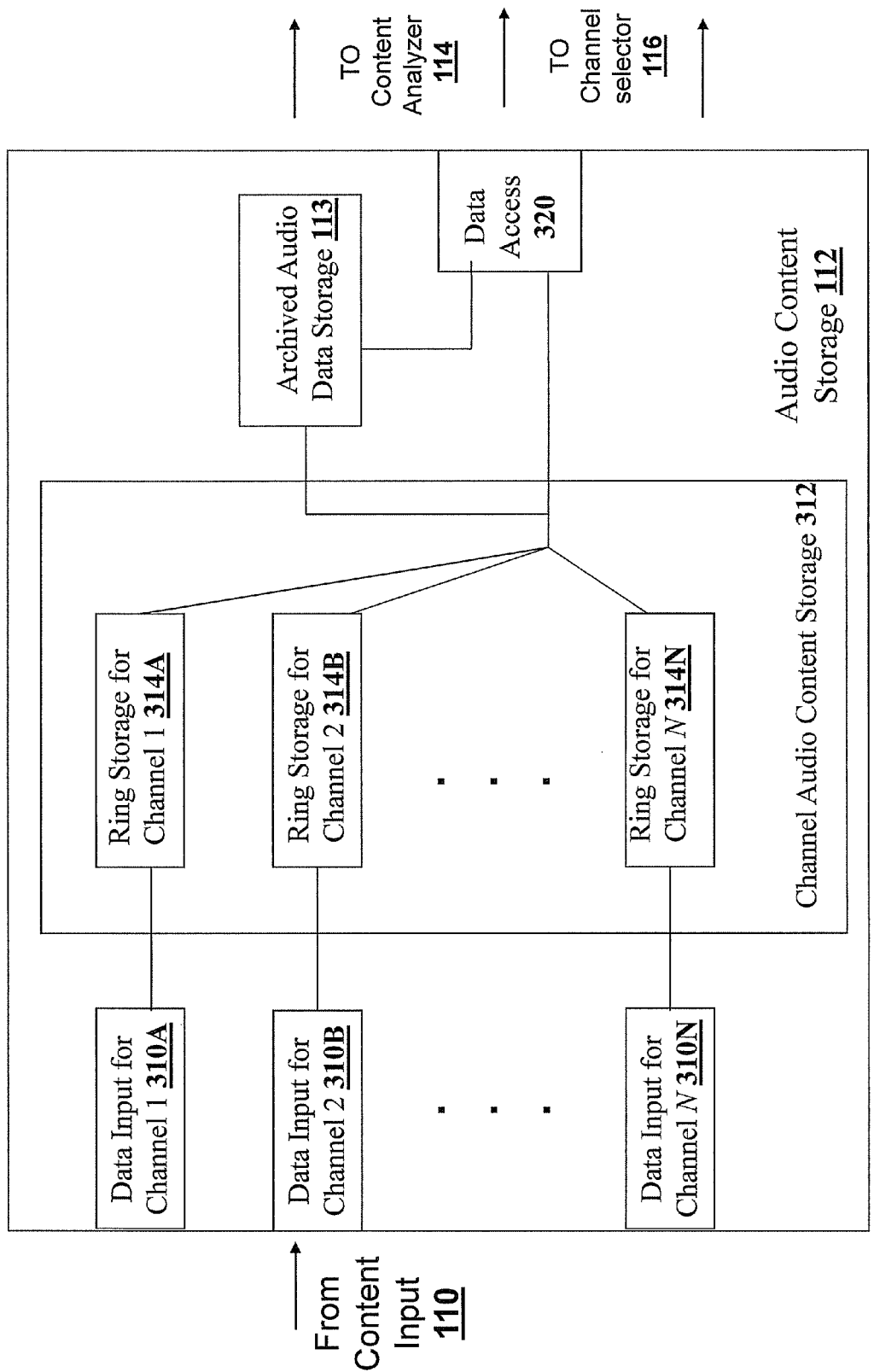
FIG. 5 provides a block diagram of an exemplary audio content storage.

This stored audio content may be accessed, for example, through a data access 320. As illustrated in the exemplary embodiment of FIG. 5, the content analyzer 114 and channel selector 116 access data stored in the audio content storage 112 through data access 320.

Optionally, the device is operative to "archive" audio data storage 113 from one or more channels. This may be useful when, at a given time, previously broadcast audio channel content is preferred over currently broadcast content. Thus, in one example, highly rated (i.e. using scoring and/or rating techniques implemented by the content analyzer 114) content is archived for possible later use.

Alternatively or additionally, the archived data storage 113 may include music manually deposited by the user, such as favorite sound-tracks, etc. The archived music may also be analyzed (for example, rated) by the content analyzer 114. Having quality archived content available may be useful for time periods where monitored audio channels do not provide content of sufficiently high quality. During these time periods, the channel selector 116 may elect to "tune" to the archived content, and forward directives to play the archived content 116 to the audio output 120 (i.e. either a device such as a speaker, and/or an output to an external audio output device).

Content Analyzer 114
Feature Extraction

The content analyzer 114 includes a plurality of data inputs 410 for receiving audio content data, for example, from the content storage 112. The content analyzer includes a feature extractor 412 for extracting various features from the audio. This feature extractor 412 may be configurable in accordance with data of the feature specification repository 414. In some embodiments, the user interface 122 is operative to allow a user to provide specifications of features to be extracted. The features optionally are provided by users, for example, from the user interface 122 including an input (for example a keyboard) and/or an output (for example, a display).

Thus, in exemplary embodiments, one or more feature extraction routines is then applied to the audio data 410, to extract features 411 of the audio content, which are stored in volatile and/or non-volatile memory.

Exemplary features include but are not limited to:
a) a music genre (i.e. jazz, rock-n-roll, country, blues, hiphop, metal, reggae, etc);
b) music tempo features—absolute tempo and/or variations in tempo;
c) an identity of a singer (male vs. female singer, or the specific name of the singer);
d) features related to the content of spoken or sung text (for example, using a "speech to text" speech recognition techniques;
e) instrument classification (for example, string vs. wind vs. percussion vs. keyboard, type of instrument within the genre);
f) language of speech and/or lyrics (i.e. Spanish vs. English);
g) vocal solo music vs. chorus music;
h) instrumental music vs. human singing music;
i) name of a specific band and/or known music piece;
j) performing artist features (i.e. identities of singers and/or bands and/or orchestras);
k) time the music is performed (years, or decades, such as 50's, or 80's music);
l) the country the band is from (i.e. English bands such as the Rolling Stones, the Who, Pink Floyd vs. American bands such as Bruce Springstein and the East Street Band, the Allman Brothers band, the Doobie Brothers, etc);
m) position in the song—i.e. how much time has elapsed since the song has begun—this may be extracted, for example, by detecting the elapsed time since a "no music" signal on the audio channel, or, for example, by detecting the most recent lyrics, or in any number of ways.
n) silence/noise discrimination;
o) music/speech discrimination;
p) the subject of spoken words (for example, is the song a "love song" or a "political protest song, etc;" is the talk show program a "sports talk show" or a "news talk show"). This may be implemented, for example, using one or more language models;
q) detection of accents—for example, British accents, Southern accents, etc.
r) loudness;
s) tonality;
t) speaker change detection—rate of speaker change.

In some embodiments, one or more features are implemented using a features database (not shown). Thus, in one example, the lyrics of "Rolling Stones" songs are stored in a database, and speech to text functionality is provided. According to this example, if the identified lyrics match the "Rolling Stones" lyrics, the music is classified as "Rolling Stones" music, music from a British band, Rock music, etc.

Techniques for classifying audio content are well known in the art, and may include one or more of machine learning/data mining techniques (including but not limited to Hidden Markov Model (HMM) techniques, neural networks, support vector machines, decision trees, etc) for example, employing supervised and/or unsupervised learning, pattern matching techniques, speech recognition techniques, voice recognition techniques, metalearning techniques, clustering approaches, and other known techniques for classifying audio content (voice and/or music).

The skilled artisan is directed to, for example, the following documents, all of which are incorporated by reference in their entirety: US 2004/0231498 entitled "Music Feature Extraction Using Wavelet Coefficient Histograms," US 2005/0016360 entitled "System and Method for Automatic Classification of Music," US 2006/0136211 entitled "Audio Segmentation and Classification Using Threshold Value" and US 2003/0101050 entailed "Real-time Speech and Music Classifier." Methods for classifying audio signal are known in the art and are described in much detail in the publication "Report on characterization of generic audio signals" known as public deliverable ESPRIT 28798, published in http://www.hitech-projects.com/euprojects/avir/deliverables/990916-d4-final.pdf; H. Deshpande, R. Singh, and U. Nam. Classification of music signals in the visual domain. In Proceedings of the COST-G6 Conference on Digital Audio Effects, 2001; T. G. Dietterich and G. Bakiri. Solving multiclass learning problems via error-correcting output codes. Journal of Artificial Intelligence Research, 2:263-286, 1995; W. J. Dowling and D. L. Harwood. Music Cognition. Academic Press, Inc, 1986. P. Flandrin. Wavelet analysis and synthesis of fractional Brownian motion. IEEE Transactions on Information Theory, 38(2):910-917, 1992; J. Foote. Content-based retrieval of music and audio. In Multimedia Storage and Archiving Systems II, Proceedings of SPIE, pages 138-147, 1997; J. Foote and S. Uchihashi. The beat spectrum: a new approach to rhythm analysis. In IEEE International Conference; M. Goto and Y. Muraoka. A beat tracking system for acoustic signals of music. In ACM Multimedia, pages 365-372, 1994; T. Lambrou, P. Kudumakis, R. Speller, M. Sandler, and A. Linney. Classification of audio signals using statistical features on time and wavelet transform domains. In Proc. Int. Conf. Acoustic, Speech, and Signal Processing (ICASSP-98), volume 6, pages 3621-3624, 1998; J. Laroche. Estimating tempo, swing and beat locations in audio recordings. In Workshop on Applications of Signal Processing to Audio and Acoustics (WASPAA01), 2001; G. Li. and A. A. Khokhar. Content-based indexing and retrieval of audio data using wavelets. In IEEE International Conference on Multimedia and Expo (II), pages 885-888, 2000; T. Li, Q. Li, S. Zhu, and M. Ogihara. A survey on wavelet applications in data mining. SIGKDD Explorations, 4(2):49-68, 2003; B. Logan. Mel frequency cepstral coefficients for music modeling. In Proc. Int. Symposium on Music Information Retrieval ISMIR, 2000; T. M. Mitchell. Machine Learning. The McGraw-Hill Companies, Inc., 1997; D. Perrot and R. R. Gjerdigen. Scanning the dial: an exploration of factors in the identification of musical style. In Proceedings of the 1999 Society for Music Perception and Cognition, page 88, 1999; Tao Li, Mitsunori Ogihara, Music artist style identification by semi-supervised learning from both lyrics and content, Proceedings of the 12th annual ACM international conference on Multimedia, Oct. 10-16, 2004, New York, N.Y., USA; D. Pye. Content-based methods for managing electronic music. In Proceedings of the 2000 IEEE International Conference on Acoustic Speech and Signal Processing, 2000; L. Rabiner and B. Juang. Fundamentals of Speech Recognition. Prentice-Hall, N.J., 1993; J. Saunders. Real-time discrimination of broadcast speech/music. In Proc. ICASSP 96, pages 993-996, 1996; E. Scheirer. Tempo and beat analysis of acoustic musical signals. Journal of the Acoustical Society of America, 103(1), 1998; E. Scheirer and M. Slaney. Construction and evaluation of a robust multifeature speech/music discriminator. In Proc. ICASSP'97, pages 1331-1334, Munich, Germany, 1997; H. Soltau, T. Schultz, and M. Westphal. Recognition of music types. In Proceedings of the 1998 IEEE International Conference on Acoustics, Speech and Signal Processing, 1998; G. Tzanetakis and P. Cook. Marsyas: A framework for audio analysis. Organized Sound, 4(3):169-175, 2000; G. Tzanetakis and P. Cook. Musical genre classification of audio signals. IEEE Transactions on Speech and Audio Processing, 10(5), July 2002; E. Wold, T. Blum, D. Keislar, and J. Wheaton. Content-based classification, search and retrieval of audio. IEEE Multimedia, 3(2):27-36, 1996; T. Zhang and C.-C. J. Kuo. Audio content analysis for online audiovisual data segmentation and classification. IEEE Transactions on Speech and Audio Processing, 3(4), 2001. George Tzanetakis, and Perry Cook, "Musical Genre Classification of Audio Signals," IEEE Transaction on Speech and Audio Processing, VOL. 10, NO. 5, July 2002; Eric D. Scheirer, "Tempo and Beat Analysis of Acoustic Musical Signals," Journal of Acoustical Society of America, 1998; Stephen Hainsworth, and Malcolm Macleod, "Onset Detection in Musical Audio Signals," In proceeding of the International Computer Musical Conference, 2003; Masataka Goto, Yoichi Muraoka, "A Beat Tracking System for Acoustic Signals of Music," ACM Multimedia 1994; Masataka Goto, "An Audio-Based Real-time Beat Tracking System for Music With or Without Drum-sounds," Journal of New Music Research, 2001, Vol. 30, No. 2, pp. 159-171; Gerhard Widmer, "The Musical Expression Project: A Challenge for Machine Learning and Knowledge Discovery," In proceeding of the 12th European Conference on Machine Learning (ECML) 2001.

Audio Content Rating and/or Scoring

As noted above, in some embodiments, data indicative of extracted features 411 of the audio content are stored in volatile and/or non-volatile memory. This can be useful in a number of applications.

In one example, user preferences stored in a rule and/or preference repository (provided explicitly, for example, from user interface 122 and/or implicitly, for example, based on user behavior, for example, based on historical user switching of stations, etc).

In some embodiments, data indicative of a rating and/or score is computed by the scorer and/or rule applier 422. In one example, the user indicates a preference for slow music, and the extracted music tempo is compared with what is typically a "Slow" tempo. If the music on a particular audio channel has a slow tempo, this can increase the rating and/or scoring. In another example, a user has exhibit preferences for love songs by female singers, and a rating and/or score is increased if the extracted features match the user preferences (for example, pre-determined preferences stored in repository 420). In another example, a user prefers music pieces sung in Spanish, and the rating increases if a Spanish language song is played.

In some embodiments, the user preferences are not static, and may vary in time, according to a number of factors. In one example, the device includes a clock or clock access (not shown), and, if it is morning, a user may prefer slower tunes, and faster tunes later in the day. In another example, the rating and/or score of audio content is determined in accordance with previously played audio content. For example, if a user enjoys "Rolling Stones" songs, these songs may tend to get higher ratings and/or scores. On the other hand, if a Rolling Stones song was already played on the device, for example, 30 minutes ago, the rating of Rolling Stones songs may be much lower than for a situation where it has been 2 days since the last Rolling Stones songs has been played.

In some embodiments, the rating of the content may be determined by a position in the song. For example, if a preferred song is 4 minutes and 23 seconds long, if the audio channel is broadcasting the beginning of the song (for example, a time elapsed of less than 30 seconds), the rating of the preferred song may be much higher than if the audio channel is broadcasting the tail end of the song (for example, more than 4 minutes has elapsed).

In some embodiments, a user may be able to define a plurality of "moods" or "preference mode." Thus, according to one example, a user may sometimes enjoy fast rock music, sometimes slow jazz, and sometimes classical music. The user may prefer certain artists from all genres.

According to this example, a plurality of distinct sets of user preferences may be provided (for example, a "rock" user preference that lists certain preferred band, a "jazz" user preference that lists certain artists, and a "classical" user preference that lists certain composers." According to this example, the user may configure the device, for example, through user interface 122, to use a specific set of user preferences, for example, by pressing on a: "jazz" button, or by typing in jazz, or selecting "jazz" from a menu. This mood may reflect what type of music or other audio content is desired at a given time.

Referring once again to FIG. 6, it is noted that the results 430 of the analysis of audio content (for example, "ratings" and/or "rule" and/or "scoring analysis") may be stored in volatile and/or non-volatile memory.

Channel Selector 116

Some embodiments of the present invention provide a channel selector 116 operative to tune to a specific audio data channel selected from the plurality of audio data channels in accordance with the results of audio content analysis (feature analysis and/or scoring or rating analysis and/or another analysis).

Figure 7:
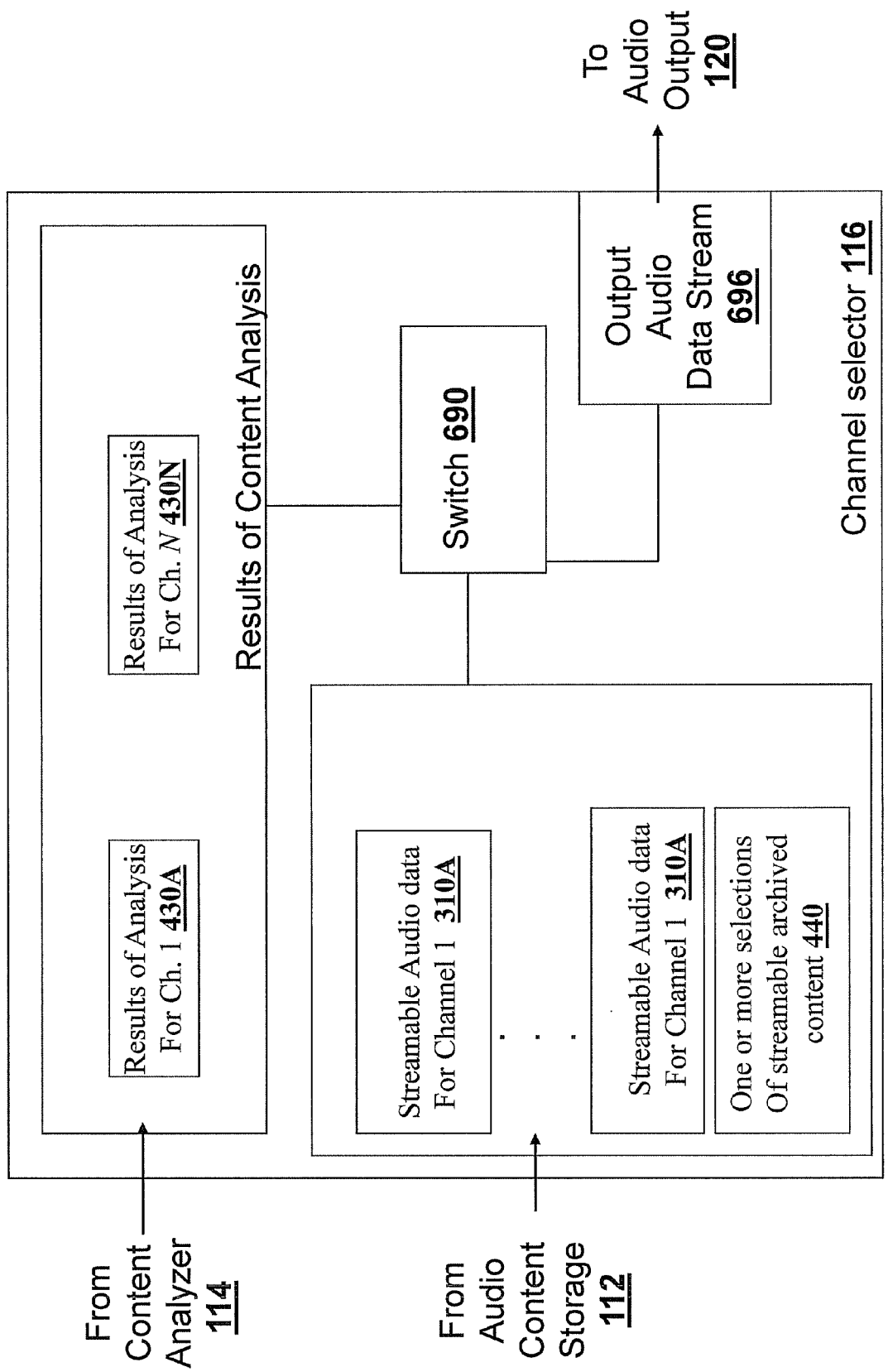
FIG. 7 provides a block diagram of an exemplary channel selector.

In the example of FIG. 7, the channel selector may access the streamable audio data 310 and the results of analysis 410. In accordance with the results of the analysis, a switch 690 may forward an output audio data stream 696 to the audio output 120, causing the device to tune to a specific streamable audio data channel.

In some embodiments, the switch 690 may be a "dumb" switch operative, for example, to tune to the highest rated content. Alternatively, the switch may also implement various features, for example, a "eliminated or reduced automatic channel surfing" feature. According to this feature, if the channel selector 116 has recently (for example, in the last 2 minutes) switched from one channel to another channel, then even if a third channel provides "better" or higher rated content, the switch will not "jump" to the new channel, to avoid a user experience where the device is often jumping between stations.

Alternatively, this functionality may be implemented in the scorer and/or rule applier 422, which, for example, can rate content in accordance with a desire to not switch the tuned station too often.

In some embodiments, this functionality is configurable, for example, through a user interface where the user specifies how often the channel may be changed, or how to penalize channel changing, etc.

Figure 8:
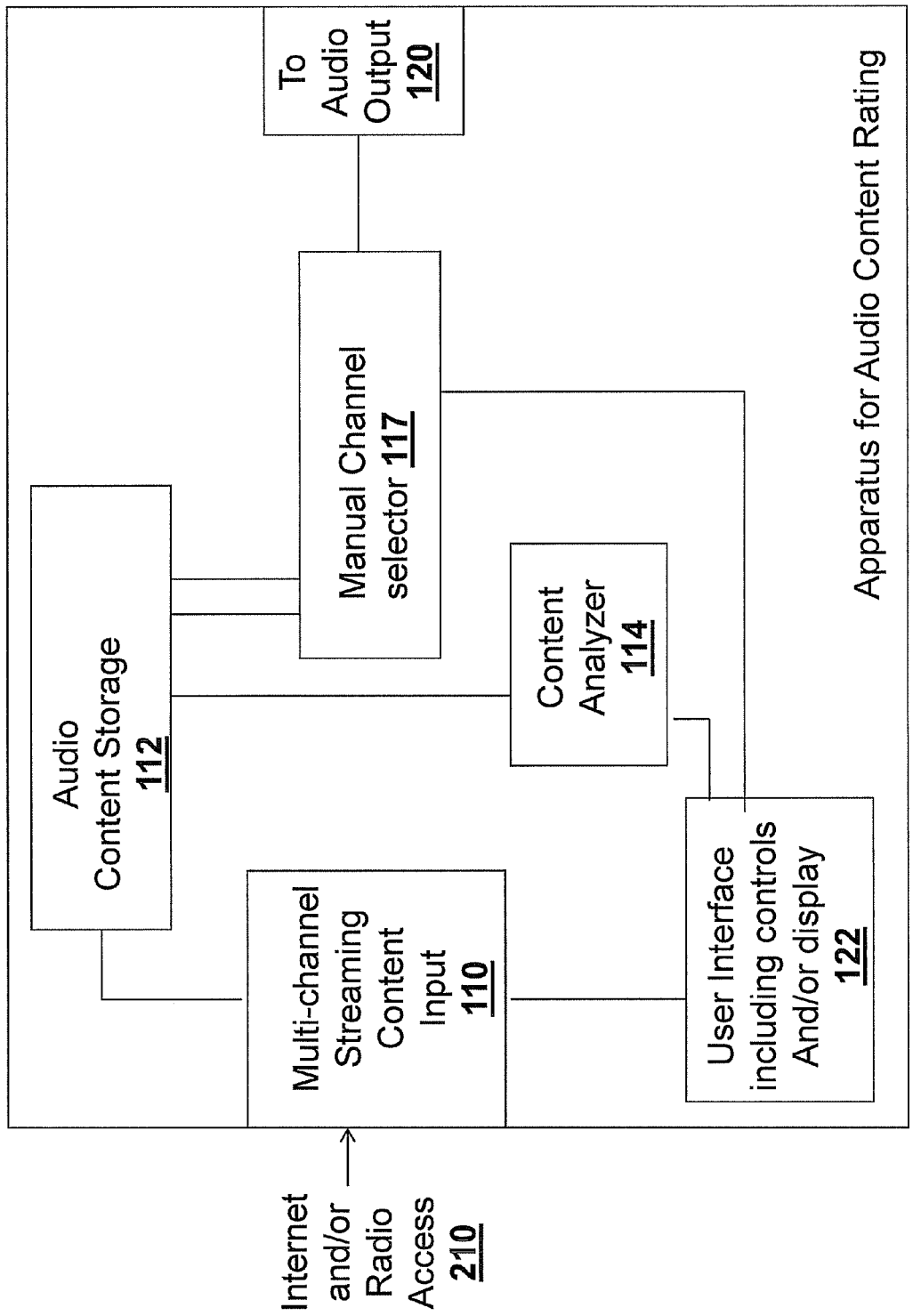
FIG. 8 provides a block diagram of an exemplary content rating device.

FIG. 8 is a block diagram of an exemplary content rating device.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. An audio content processing device that is operative to:
   a) monitor the content of at least two streaming audio content channels simultaneously; and
   b) compute respective ratings for each said monitored content channel, wherein the audio content processing device includes a content analyzer configured to extract audio content features from said monitored content channels and to compute the respective ratings using the extracted features and a stored content preference for a user that varies with time, wherein computing the respective ratings using the extracted features and the stored content preference for the user that varies with time includes assigning different ratings values to particular audio content, wherein assigning the different ratings values includes assigning a first ratings value to a song from an artist currently being played on one of said monitored content channels in response to a song from the same artist being played on the device a first time period before the currently playing song and assigning a second ratings value to the currently playing song in response to a song from the same artist being played on the device a second time period before the currently playing song, wherein the first ratings value is lower than the second ratings value and wherein the first time period is less than the second time period.

2. The device of claim 1 where the device is further operative to:
   c) display to a user data indicative of computed ratings.

3. The audio content processing device of claim 1, wherein assigning different ratings values includes assigning higher ratings values to slower songs than faster songs playing on said monitored content channels in the morning and assigning lower ratings values to slower songs than faster songs playing on said monitored content channels in the afternoon.

4. The audio content processing device of claim 1, wherein assigning different ratings values includes assigning a higher ratings value to a preferred song playing on one of said monitored content channels if the content channel is playing a position in the song nearer to a beginning of the song than an end of the song.

5. A method for rating audio content comprising:
   a) concurrently monitoring a plurality of channels, each said channel providing respective streaming content; and
   b) computing respective ratings of said respective streaming content of said monitored content channels, wherein computing the respective ratings includes utilizing a content analyzer to extract audio content features from said monitored content channels and to compute the respective ratings using the extracted features and a stored content preference for a user that varies with time, wherein computing the respective ratings using the extracted features and the stored content preference for the user that varies with time includes assigning different ratings values to particular audio content, wherein assigning the different ratings values includes assigning a first ratings value to a song from an artist currently being played on one of said monitored channels in response to a song from the same artist being played on the device a first time period before the currently playing song and assigning a second ratings value to the currently playing song in response to a song from the same artist being played on the device a second time period before the currently playing song, wherein the first ratings value is lower than the second ratings value and wherein the first time period is less than the second time period.

6. The method of claim 5 wherein assigning different ratings values includes assigning higher ratings values to slower songs than faster songs in the morning and assigning lower ratings values to slower songs than faster songs in the afternoon.

7. The method of claim 5 wherein assigning different ratings values includes assigning a higher ratings value to a preferred song playing on one of said monitored content channels if the content channel is playing a position in the song nearer to a beginning of the song than an end of the song.

8. A non-transitory computer readable medium comprising program instructions, wherein when executed the program instructions are operable to:
   a) concurrently monitor a plurality of channels, each said channel providing respective streaming content; and
   b) compute respective ratings of said respective streaming content of said monitored content channels, wherein computing the respective ratings includes utilizing a content analyzer to extract audio content features from said monitored content channel and to compute the respective ratings using the extracted features and a stored content preference for a user that varies with time, wherein computing the respective ratings using the extracted features and the stored content preference for the user that varies with time includes assigning different ratings values to particular audio content, wherein assigning the different ratings values includes assigning a first ratings value to a song from an artist currently being played on one of said monitored content channels in response to a song from the same artist being played on the device a first time period before the currently playing song and assigning a second ratings value to the currently playing song in response to a song from the same artist being played on the device a second time period before the currently playing song, wherein the first ratings value is lower than the second ratings value and wherein the first time period is less than the second time period.

9. The non-transitory computer readable medium of claim 8, wherein assigning different ratings values includes assigning higher ratings values to slower songs than faster songs playing on said monitored content channels in the morning and assigning lower ratings values to slower songs than faster songs playing on said monitored content channels in the afternoon.

10. The non-transitory computer readable medium of claim 8, wherein assigning different ratings values includes assigning a higher ratings value to a preferred song playing on one of said monitored content channels if the content channel is playing a position in the song nearer to a beginning of the song than an end of the song.

* * * * *